United States Patent [19]
Dull et al.

[11] Patent Number: 5,195,621
[45] Date of Patent: Mar. 23, 1993

[54] TORQUE CONVERTER AND CLUTCH WITH A TURBINE RING FRICTION INTERFACE

[75] Inventors: Dennis C. Dull, Arcanum; James P. Poorman, Huber Heights, both of Ohio

[73] Assignee: General Motors Corporation, Detroit, Mich.

[21] Appl. No.: 884,354

[22] Filed: May 18, 1992

[51] Int. Cl.⁵ .................................................. F16H 45/02
[52] U.S. Cl. ..................................... 192/3.29; 192/3.3
[58] Field of Search ........................ 192/3.28, 3.29, 3.3

[56] References Cited

U.S. PATENT DOCUMENTS

| | | | |
|---|---|---|---|
| 2,920,728 | 1/1960 | Föster | 192/3.29 |
| 3,040,589 | 6/1962 | Chapman | 192/3.3 X |
| 3,252,352 | 5/1966 | General et al. | 192/3.29 X |
| 4,177,885 | 12/1979 | Ross | 192/3.3 |
| 5,086,892 | 2/1992 | Schierling | 192/3.29 |
| 5,103,947 | 4/1992 | Okuzumi | 192/3.25 |

FOREIGN PATENT DOCUMENTS

| | | | |
|---|---|---|---|
| 54-159560 | 12/1979 | Japan | 192/3.28 |
| 58-131466 | 8/1983 | Japan | 192/3.29 |

Primary Examiner—Richard M. Lorence
Attorney, Agent, or Firm—Donald F. Scherer

[57] ABSTRACT

A torque converter and clutch assembly has a friction ring secured to the turbine which provides a friction interface for the clutch. The clutch has a spline input connection between the input shell and a clutch damper input. The pressure plate provides the damper output and supports an annular friction pad which cooperates, during engagement, with the friction ring on the turbine to complete the friction interface.

3 Claims, 1 Drawing Sheet

TORQUE CONVERTER AND CLUTCH WITH A TURBINE RING FRICTION INTERFACE

BACKGROUND OF THE INVENTION

This invention relates to torque converter and clutch assemblies, and more particularly, to such assemblies wherein a friction interface is disposed on the turbine. Specifically, this invention relates to such assemblies having an inertial mass secured to the turbine on which a friction interface is provided for improved clutch engagement.

Prior art torque converter and clutch assemblies incorporate a pressure plate with a friction disc bonded thereto and disposed for axial displacement for engagement with the input shell of the torque converter. The input shell of the torque converter generally has a machined surface thereon which provides the frictional interface for the friction disc and pressure plate. Due to tolerances and manufacturing methods, the alignment of the annular surface of the friction disc and the input shell is not ideal. In other words, there are imperfections such as waviness or conical configurations which prevent the frictional surfaces from providing a continuous annular engagement.

Prior art torque converter and clutch assemblies have attempted solutions to this problem including the use of an elastomer disc bonded between the friction material and the pressure plate. This solution does afford some degree of relief for the problem, however, the bonding material and the elastomer disc must be sufficiently strong to withstand the stresses present during the transmission of torque between the input shell and the pressure plate. This torque transmission results in shear forces being imposed on the elastomer disc and between the elastomer disc and its bonded surfaces. Since these shear forces can be quite large and have a detrimental affect on the elastomer material, the useful life of the clutch is shortened and/or the cost of bonding, bonding materials and elastomer materials is greatly increased.

Another prior art arrangement, described in U.S. Ser. No. 07/881,107, filed May 11, 1992, Hageman et al., assigned to the assignee of this invention, provides a compliant interface between the pressure plate, friction surface and the input shell. In this arrangement, a friction disc is disposed on a separate rigid member which is substantially rotatably secure with the pressure plate while being axially movable relative thereto. An elastomeric covered metal disc is disposed between the friction disc and the pressure plate and is made rotatably fast with the friction disc.

The friction performance of a torque converter clutch (TCC), during the apply and release transients and during engaged operation, is dependent on the performance of the friction system determined by the operating conditions, geometry and frictional characteristics of interacting mechanical components and the friction modifying characteristics of the surrounding oil. A well controlled friction system is expected to yield predictable operating characteristics and assist in system tuning for optimal performance and pleaseability of the TCC system. Friction system characteristics, which affect performance, include friction material operating characteristics and geometry and reaction surface operating characteristics, geometry and surface texture.

The dynamic response of a vibrating system affects perceived performance and is primarily characterized by the natural frequency of the system, as well as the amplitude and phase relationship of the vibrating members of the system. System tuning of these characteristics is generally undertaken in such a manner as to avoid undesirable disturbances within the operating range of the system.

There are several possible methods for tuning the dynamic response of automatic transmission driveline systems. Classically, isolator springs or damper springs are tuned to adjust the dynamic response of the driveline for the purpose of isolating or avoiding disturbances during TCC engaged operation and thus provide a pleaseable driveline "feel" in the vehicle. Several other means exist to tune the system. System rotational inertias, damping, hysteresis and system forcing function (gas torque from the engine) can be designed, tweaked or tuned to provide various steady state response characteristics. System hysteresis and damping can be used to tune the system for various transient response characteristics, such as shudder. One such system is described in U.S. Ser. No. 07/877,509, filed May 1, 1992, Poorman et al., and assigned to the assignee of the present invention. Another system with improved inertia tuning is described in U.S. Pat. No. 5,121,821, issued Jun. 16, 1992, to Poorman et al., and assigned to the assignee of the present invention.

SUMMARY OF THE INVENTION

This invention addresses vibrational aspects of the driveline assembly TCC engagement, as well as the frictional performance of the converter clutch friction system.

The invention comprises a torque converter clutch assembly, such that the friction interface reacts on a surface that is rigid with the turbine instead of reacting on the converter front cover. The reaction inertia ring provides an explicit inertia addition to the turbine similar to that described in the above U.S. Ser. No. 07/877,509, to tune the system natural frequency lower in frequency. Additionally, the torque converter clutch pressure plate and spring cages couple rigidly to the turbine during converter clutch engagement. The pressure plate and pack are active on the turbine side of the friction interface contributing to increasing the effective transmission "lump" of inertia that represents the most active inertia during the steady state vibrational disturbance. The inertia contribution from the pressure plate and springs does not increase the overall driveline inertial, but does dispose the pressure plate and springs for maximum benefit.

The specific advantage over U.S. Ser. No. 07/877,509 offered by the present invention is that the inertia tuning used to control the driveline vibration disturbances during low engine speed with the torque converter clutch engaged, is only partially the result of additional parts, mass and/or inertia in the form of a ring. This invention takes advantage of some inertia components that already exist in the torque converter assembly. Specifically the torque converter clutch pressure plate and spring cage assembly is decoupled from the engine inertia and coupled to the transmission inertia lump during converter clutch engaged operation.

As mentioned above, the advantages offered by this invention address the friction system performance, as well as TCC engaged vibrational performance. The frictional advantages provided by this invention include the following.

The friction reaction inertia ring, provides control of the geometry of the friction reaction surface. Concavity, flatness, straightness, uniformity, waviness and surface finish/texture (as well as other geometric surface parameters) can each/all be established on the reaction ring after the ring is attached to or formed integrally with the turbine assembly. Unlike the prior art clutches where the reaction surface is part of the torque converter cover, the geometry of the reaction surface of the present invention remains unchanged during the final assembly closure weld of the torque converter housing. The heat from the closure weld will not affect the friction system geometry.

It is therefore the primary object of this invention to provide an improved torque converter and clutch assembly wherein a friction interface reaction inertia ring is secured to the turbine to provide for improved control of unit loading on the clutch friction material.

The combination of improved friction system geometry and improved control of friction material loading offers another highly significant potential advantage. Considering the options described above, this invention allows for the use of more types of friction material that are not compatible with current torque converter clutch concepts or operating requirements. Improved component geometry and friction material unit loading control allows for the application of friction materials that exhibit improved friction characteristics in torque converter clutch applications. Torque converter engagement feel, release feel, shudder resistance, torque capacity, and friction material durability are improved due to the friction system control offered with this concept.

These and other objects and advantages of the present invention will be more apparent from the following description and drawings.

DESCRIPTION OF THE PREFERRED EMBODIMENT

Figure 1:
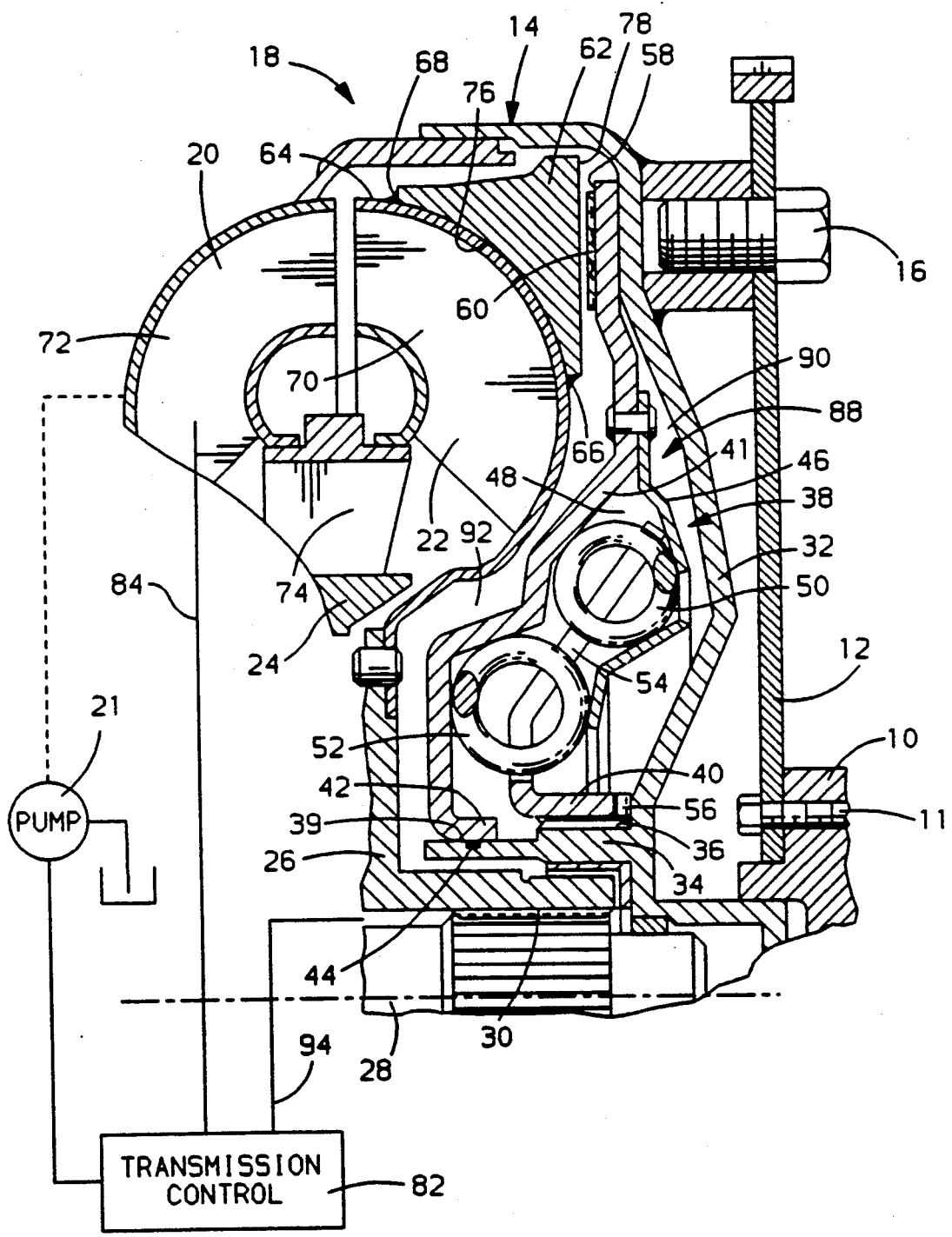
FIG. 1 is a cross-sectional elevational view of a portion of a torque converter and clutch assembly incorporating the present invention.

Referring to the drawing, an engine output shaft or crankshaft 10 which is secured by a plurality of fasteners 11 to a conventional flex plate 12, which in turn is secured to an input shell 14 by conventional fasteners 16. The input shell 14 is a component of a torque converter 18 which also includes an impeller 20 drivingly connected to the input shell 14 and including an output hub, not shown, which is adapted to drive a conventional positive displacement fluid pump 21.

As is well known in fluid drives, such as the torque converter 18, the fluid source is present to maintain the torque converter filled with fluid. The torque converter 18 further includes a turbine 22 and a stator 24 which are disposed in toroidal fluid flow relationship with the impeller 20. The stator 24 is connected via a conventional one-way device, not shown, to a stationary component or housing of a transmission, also not shown.

The impeller 20, turbine 22 and stator 24 are conventional bladed members which, as is well known, provide a fluid drive between the engine crankshaft 10 and various components of a power transmission. The turbine 22 has a hub 26 which is connected to drive a transmission input shaft 28 through a spline connection 30.

The input shell 14 has a substantially annular wall 32 which has extending axially therefrom a hub portion 34. The hub 34 has an annular wall portion having a splined outer diameter portion 36 and a smooth outer diameter portion 39. The splined portion 36 is drivingly engaged with a hub member 40 which is an input device for a damper and clutch assembly, generally designated 38.

The damper 38 further includes a clutch pressure plate 41 having an inner annular portion 42 which is slidably disposed on the diameter portion 39. A seal member 44 cooperates with the annular portion 42 and the diameter portion 39 to prevent fluid transfer from one side of the pressure plate 41 to the other at the inner diameter. A cage wall 46 is secured to the pressure plate 41 and cooperates therewith to form a cavity 48 in which is disposed a plurality of damper springs 50, 52. The damper springs 50, 52 are dispersed in equally spaced compartments about the cavity 48. These structures are well known in damper assemblies. The hub 40 has a plurality of arm portions, such as 54, which abut one side of the springs 50, 52, and the cage assembly has tab components, not shown, which are also disposed for abutment with the springs 50, 52.

As is well known with such damper assemblies, the springs will compress when there is angular excursion between the input hub 40 and the pressure plate 41. An apply or tickle spring 56 is disposed between the annular wall 32 and the hub 40 to urge the pressure plate 41 toward the turbine 22.

The pressure plate 41 has an annular surface 58 formed at the outer periphery thereof, to which is bonded an annular friction disc 60. The annular friction disc 60 faces a friction surface and inertia mass 62 which is secured to the outer surface 64 of the turbine 22 by a plurality of welds 66 and 68. As is well known, the inner contour of the turbine 22 is provided with a plurality of blade members 70 which cooperate with blade members 72 on the impeller 20 and blade members 74 on the stator 24 to describe toroidal flow paths for fluid which is delivered from the pump 21. The fluid provides a drive connection between the impeller 20 and the turbine 22 in a well known manner.

As is also well known, the outer surface 64 of the turbine 22 is substantially a semitoroidal shape having a relatively smooth curved outer surface. The inertia mass and friction surface 62 also has a curved surface 76 which is complementary to the curve of the surface 64 thereby permitting accommodation of the inertia mass 62 on the turbine 22. The inertia mass and friction surface 62 is essentially annular and presents a flat friction interface 78 facing the friction disc 60.

The pump 21 delivers pressurized fluid in a well known manner to a conventional transmission control 82 which operates in a well known manner to deliver fluid under pressure through a passage 84 to the torque converter 18 at the impeller 20, such that the blades 72 receive fluid. The fluid circulates through the torque converter 18 in a well known manner.

The damper and clutch assembly 38 is disposed in a clutch chamber, generally designated 88, formed between the input shell 14 and the turbine 22. An area or apply chamber to the right of the pressure plate 41, designated 90, is pressurized whenever the friction interface or disc 60 is forced into engagement with the friction surface 78. When it is desired to have the clutch disengaged, a cavity or disengaging chamber 92 formed intermediate the turbine 22 and the pressure plate 41 is pressurized thereby forcing the pressure plate rightward away from the friction interface 78.

The fluid within the cavity 92 is controlled by connecting a passage 94 from the control 82 to either high pressure fluid or exhaust. When the passage 94 is connected to exhaust, the pressure in cavity 92 will decrease permitting the spring 56 to urge the pressure plate leftward thereby enforcing frictional engagement of the friction disc 60 and the inertia mass and friction interface 62. When this interaction occurs, fluid pressure escaping radially outward between the impeller 20 and turbine 22 will pass to the chamber 90 thereby providing a pressure unbalance on the pressure plate 41 which will assist in engagement of the clutch assembly.

As should be apparent from the description given above, the inertia mass 62, as well as the pressure plate 41 and the springs 50 and 52, will rotate in unison with the torque converter turbine 22 whenever the clutch and damper assembly 38 is forced into the engaged condition. Thus, the inertia on the torque converter turbine 22, and therefore the transmission, will be significantly increased by the clutch engagement such that the low speed performance of the powertrain will be improved.

The embodiments of the invention in which an exclusive property or privilege is claimed are defined as follows:

1. A torque converter and clutch comprising: an input shell; an impeller drivingly connected with said input shell; turbine means mounted on an axis for rotation and having a bladed portion for receiving fluid from said impeller, a substantially semi-toroidal outer surface and an inertia mass secured to the outer surface of the turbine having a substantially semi-toroidal surface complementary to the turbine outer surface and a flat annular friction surface disposed in a plane substantially perpendicular to the axis of rotation of the turbine; and torque converter clutch means for establishing a friction drive connection between said input shell and said turbine including a pressure plate drivingly connected with and axially movable relative to the input shell and an annular friction facing secured to said pressure plate in axial alignment with, presented toward and selectively frictionally engageable with said flat annular friction surface.

2. A torque converter and clutch comprising: an input shell; an impeller drivingly connected with said input shell; turbine means mounted on an axis for rotation and having a bladed portion for receiving fluid from said impeller, a substantially semi-toroidal outer surface and an inertia mass secured to the outer surface of the turbine having a substantially semi-toroidal surface complementary to the turbine outer surface and a flat annular friction surface disposed in a plane substantially perpendicular to the axis of rotation of the turbine; and torque converter clutch means for establishing a friction drive connection between said input shell and said turbine including a pressure plate drivingly connected to and axially movable relative to the input shell, an annular friction facing secured to said pressure plate in axial alignment with, presented toward and selectively frictionally engageable with said flat annular friction surface, a clutch disengaging pressure chamber formed between the pressure plate and the turbine and an apply chamber formed between the pressure plate and the input shell.

3. A torque converter and clutch comprising: an input shell; an impeller drivingly connected with said input shell; turbine means mounted on an axis for rotation and having a bladed portion for receiving fluid from said impeller, a substantially semi-toroidal outer surface and an inertia mass secured to the outer surface of the turbine having a substantially semi-toroidal surface complementary to the turbine outer surface and a flat annular friction surface disposed in a plane substantially perpendicular to the axis of rotation of the turbine; and torque converter clutch means for establishing a friction drive connection between said input shell and said turbine including a pressure plate drivingly connected with and axially movable relative to the input shell, damper means drivingly connected between the input shell and the pressure plate, an annular friction facing secured to said pressure plate in axial alignment with, presented toward and selectively frictionally engageable with said flat annular friction surface, a clutch disengaging pressure chamber formed between the pressure plate and the turbine and an apply chamber formed between the pressure plate and the input shell, and spring means disposed between the input shell and the damper for urging the pressure plate toward engagement with the inertia mass.

* * * * *